Nov. 22, 1966     P. J. PERRY     3,286,346

DEVICE FOR SCORING AND PEELING CITRUS FRUIT

Filed July 14, 1965

INVENTOR.
PETER J. PERRY
BY Fred C. Matheny
ATTORNEY

United States Patent Office 3,286,346
Patented Nov. 22, 1966

3,286,346
DEVICE FOR SCORING AND PEELING CITRUS FRUIT
Peter J. Perry, 1900 18th Ave. S., Seattle, Wash. 98144
Filed July 14, 1965, Ser. No. 471,983
3 Claims. (Cl. 30—24)

My invention relates to a device for scoring and peeling citrus fruit, such as oranges, lemons, grapefruit and the like and an object of my invention is to provide a device or utensil by which the peeling of a citrus fruit can be loosened from the edible part of the fruit in the form of two cup shaped semi-globular halves without injury to or mutilation of the edible part of the fruit and in such a manner as to make it possible to leave the loosened cup shaped halves of the peeling on the fruit for later removal if desired.

Another object is to provide a citrus fruit peeling device comprising a frame part having two bent wire peeling members rigid therewith and extending in opposite directions therefrom each of said peeling members being of approximately U-shape and being formed of smooth wire free from cutting edges and terminating in a closed outer end portion, the shapes of the closed outer end portions being different for selective use and each peeling member being capable of use as a handle by which the other peeling member can be thrust between the peeling and edible portion of a citrus fruit to loosen the peeling on the fruit.

Another object is to provide a citrus fruit peeling device which has a transversely protruding pin type scoring member provided approximately mid way of the length of the device in a position where it is readily applicable to a citrus fruit for the purpose of scoring the peeling of the fruit in a circular path and leaving around the fruit a groove through which an outer end portion of one of the peeling members may be inserted between the peeling and the edible part of the fruit to loosen the peeling.

Other objects are to provide a citrus fruit peeling device of simple and inexpensive construction which is neat and attractive in appearance, easy to use and which is easily cleaned and therefore sanitary.

Further objects of the invention will be apparent from the following description taken in connection with the accompanying drawings.

In the drawings FIGURE 1 is a plan view of a fruit peeling device or utensil made in accordance with my invention.

Like reference numerals refer to like parts throughout the several views.

Figure 1:
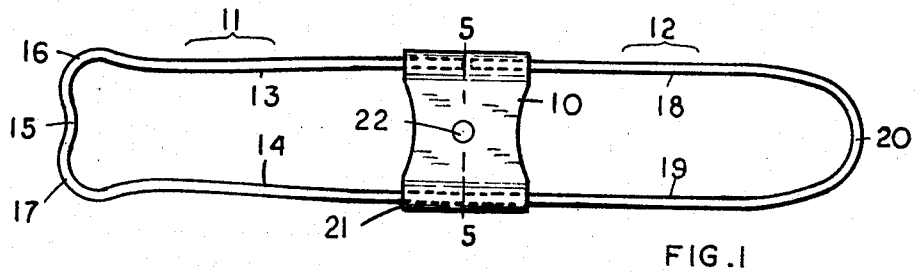
Figure 2:
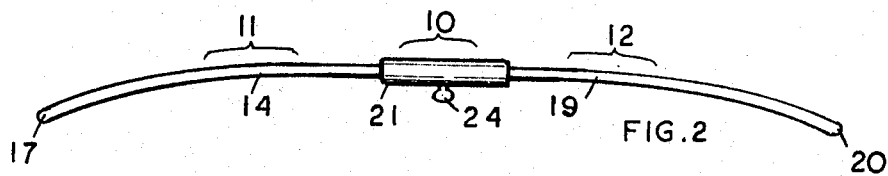
FIG. 2 is an edge view of the same.

This fruit scoring and peeling device comprises a frame member 10, which may be varied in shape and size and which receives and is rigidly connected with at least one and preferably two U-shaped fruit peeling members, indicated generally by 11 and 12. Each fruit peeling member 11 and 12 is formed of a substantially U-shaped loop of smooth wire. The fruit peeling member 11 comprises two approximately parallel side wires 13 and 14 and a closed outer end which is formed of an inwardly concave re-entrant medial part 15 connected with the side wires 13 and 14 of the loop by two outwardly convex rounded corner portions 16 and 17 respectively. The other fruit peeling member 12 comprises two approximately parallel side wires 18 and 19 connected at their outer ends by an approximately arcuate end member 20. The two fruit peeling members 11 and 12 can be formed of a single piece of wire or they can be formed of two separate pieces of wire.

The fruit peeling members 11 and 12 are both transversely curved so that they will more nearly conform to the globular shape of a citrus fruit. This curvature is preferably greatest near the closed outer ends of the members 11 and 12 and both members 11 and 12 are herein shown to be curved in the same direction so that, in an edge view the device is approximately the shape of a bow.

Figure 5:
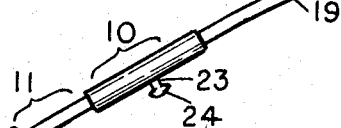
FIG. 5 is a view in cross section on an enlarged scale taken substantially on broken line 5—5 of FIG. 1, a part being shown in elevation.

The frame member 10, FIG. 5, is herein illustrated as being a piece of sheet metal with its two end portions 21 rolled and crimped tightly around the side wires of the members 11 and 12. This rigidly and permanently secures the members 11 and 12 and frame 10 together and is a simple and inexpensive form of construction and one that leaves no cracks and crevices in which dirt may collect.

A pin type scoring device is rigid with the frame member 10 and projects transversely from a flat side of said frame member in the direction of curvature of the peeling members 11 and 12. Preferably, this scoring device is located about mid way between the two ends of the frame member 10 and consists of a part 22 of larger diameter extending through and riveted to and rigid with said member 10, a shank 23 of relatively small diameter protruding from the part 22 and an oval head 24 of small size but of larger diameter than the shank 22 on the terminal end of said shank.

Figure 3:
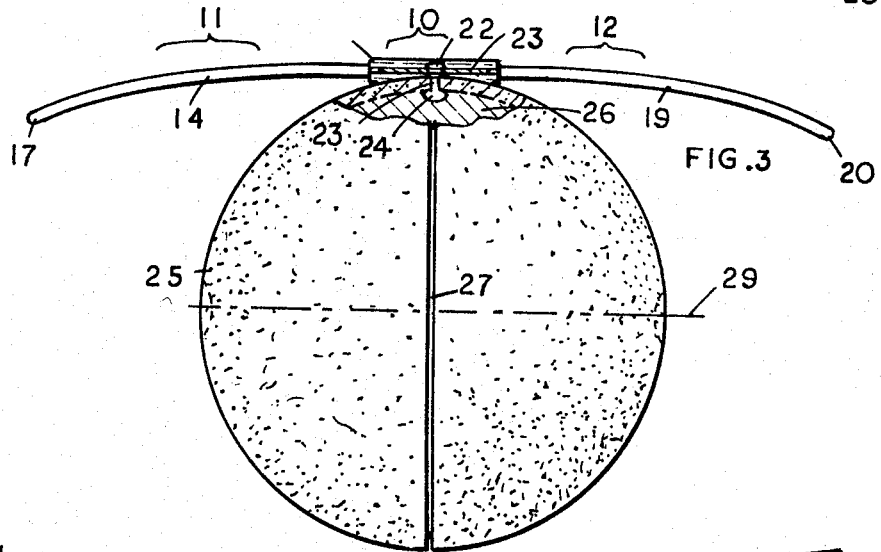
FIG. 3 is an edge view of the device illustrating its method of use in making a circular cut or groove in the peeling of a citrus fruit, such as an orange, around the fruit.

In the use of this fruit peeling device the scoring member 24, 23 is pressed into a citrus fruit, such as an orange, far enough so that the outside of the peeling 25 rests against the frame member 10 and the shank 23 extends through the peeling 25 and the head 24 is positioned between the peeling 25 and the edible portion 26 of the fruit. The device is then moved around the fruit to score and make a groove 27 all of the way around the fruit. This groove 27 is preferably positioned so that it lies in a plane transverse to an axis, indicated by dot and dash lines 29, FIG. 3, which passes through the stem and blossom ends of the fruit. All parts of the device are formed of non-corrosive stainless steel. The wire used in forming the peeling members 11 and 12 is of relatively small diameter and of a spring grade which can be bent to the desired shape but is stiff and strong enough so it will withstand all ordinary use without bending. The shank 23 is just long enough to extend through citrus fruit peeling of average thickness and the frame member 10 acts as a depth gauge to prevent the scoring device from being pushed too deeply into the fruit. Also said shank is of small enough diameter so it will easily open up or cut the narrow groove 27 in the peeling 25. The head 24 is flattened so it will follow the line of demarcation between the peeling 25 and edible part 26 of the fruit without digging into either the edible part of the fruit or the peeling. At the same time this head 24, because its edges are engaged under the peeling 25, helps to hold the scoring device in the fruit as the grooving progresses.

Figure 4:
FIG. 4 is an elevational view illustrative of the use of the device in loosening a semi-spherical portion of the peeling of a citrus fruit after it has been circumferentially grooved, as illustrated in FIG. 3, parts being broken away.

After the groove 27 is made in the fruit one of the peeling members, such as the member 12 is used as a handle and the outer end of the other peeling member, such as member 11, is repeatedly entered into the groove 27 and pushed between the peeling 25 and the edible portion partially around the fruit, as illustrated in FIG. 4, to loosen the peeling from the edible portion without damaging either the peeling or the edible portion.

The inwardly curved re-entrant part 15 of the outer end of the peeling member 11 minimizes the tendency for the peeling member to be deflected sidewise when it is pushed or thrust endwise between the peeling 25 and edible portion 26 of the fruit. However, this device will operate efficiently in loosening the peeling from most citrus fruits if the peeling member 11 is used as a handle and the member 12 with rounded end 20 is pushed between the peeling 25 and edible portion 26 of the fruit.

Applicant finds that it is difficult to loosen the peeling on most citrus fruits by imparting a sidewise movement to a peeling member after it has been inserted between the peeling 25 and edible portion 26 of a fruit and that it is much easier to loosen the peeling 25 by repeatedly thrusting or pushing the peeling device endwise under the fruit peeling 25 enough times to substantially loosen said peeling 25 all of the way around the fruit. After the cup shaped pieces of peeling on both ends of a fruit have been thus loosened they can readily be removed by imparting to them a slight twist and can be used as receptacles for the edible portions of the fruit if desired.

The foregoing description and accompanying drawings clearly disclose a preferred form of my invention but it will be understood that this disclosure is merely illustrative and that changes in the device may be made within the scope of the following claims.

I claim:
1. A citrus fruit peeling device comprising a frame member; a U-shaped peeling loop of wire protruding from said frame member, said loop having a closed outer end and having its two inner ends rigidly connected with said frame member, said loop having a curvature away from the plane of the frame in the vicinity of its outer end portion, the curvature conforming generally to that of a citrus fruit, the closed outer end portion of said U-shaped peeling loop comprising an inwardly re-entrant medial portion connected by two outwardly convex corner portions with the side members of the loop, whereby forces tending to deflect said peeling loop sidewise when it is thrust between the peeling and edible portion of a fruit are minimized; and means rigid with said frame member and protruding from said frame member in a generally opposite direction from said peeling loop, said means being capable of serving as a handle whereby said peeling loop can be thrust between the peeling and the edible portion of a citrus fruit to loosen the peeling from the edible portion of the fruit.

2. The citrus fruit peeling device as claimed in claim 1 in which a relatively short pin type scoring device having a shank of small diameter and having a rounded head on the outer end of said shank is rigidly secured to said frame member and protrudes transversely therefrom in a direction generally at right angles to the plane of the peeling loop.

3. A citrus fruit peeling device comprising a thin flat metal frame member; two approximately U-shaped wire loops of substantial length rigid with and extending outwardly in generally opposite directions from said frame member, said two loops being formed of a single piece of wire and two opposite ends of said frame member being crimped tightly around the spaced apart side wires of the two loops securing the two loops to the frame member, each loop having a closed outer end capable of loosening the peeling from the edible portion of a citrus fruit when the loop is inserted between the peeling and edible portion of the fruit, each loop having a curvature away from the plane of the frame member in the vicinity of its outer end portion, said curvature conforming in a general way to the curvature of the citrus fruit when the concave side of the loop is applied to the fruit, each loop being capable of use as a handle in applying the other loop to the fruit to be peeled; and a relatively short pin type scoring device having a shank of small diameter and having a rounded head on its outer end rigidly secured to and protruding transversely from said frame member.

References Cited by the Examiner

UNITED STATES PATENTS

| 1,220,854 | 3/1917 | Jones | 30—24 |
| 2,974,411 | 3/1961 | Little | 30—24 |
| 3,149,417 | 9/1964 | Lowry | 30—24 |

FOREIGN PATENTS

| 493,828 | 6/1950 | Belgium. |
| 1,251,146 | 12/1960 | France. |
| 737,894 | 10/1955 | Great Britain. |
| 418,097 | 2/1947 | Italy. |

WILLIAM FELDMAN, *Primary Examiner.*

G. WEIDENFELD, *Assistant Examiner.*